Dec. 31, 1940.  C. J. GRAY  2,226,813
HOP PICKING MACHINE
Filed Aug. 9, 1939  2 Sheets-Sheet 1

Inventor,
Charles John Gray
By, Vocko Blum
Attnys

Dec. 31, 1940.  C. J. GRAY  2,226,813

HOP PICKING MACHINE

Filed Aug. 9, 1939  2 Sheets-Sheet 2

Inventor,
Charles John Gray
By, Mocks Blum
Attnys

Patented Dec. 31, 1940

2,226,813

UNITED STATES PATENT OFFICE 2,226,813

HOP PICKING MACHINE

Charles John Gray, Pinner, England, assignor to Arthur Guinness Son & Company Limited, London, England Application August 9, 1939, Serial No. 289,131
In Great Britain August 20, 1938

7 Claims. (Cl. 130—30)

The present invention relates to hop picking machines, of the kind in which the bine, after having been cut from the plant, is attached to a conveyor which draws it lengthwise past one or more series of moving picking fingers carried upon rotating drums, chains or the like, and which are designed to engage the hops and pull them from the short stalks or stems by which they are attached to the bine.

In this machine, although a number of hops are successfully separated from the bine, some of them are not so successfully separated, as they are either detached in clusters or singly, upon the short stalks or stems by which they were originally attached to the bine.

It has been proposed to provide a machine of this kind with an endless screen, or wire mesh, having its respective ends passed around drums which serve to support it, and which drums are suitably driven to in turn drive the screen.

In this proposed arrangement, the wire mesh screen has been so arranged as to permit all the properly picked hops to fall down through it whilst retaining upon its upper surface any hop bearing stalk or stem portions and carrying them beneath fingers, between which and the screen such relative movement takes place as will cause said fingers to, in effect, sweep said screen in a longitudinal direction, and, in so doing, cause the hops to be caught up against the sides of the mesh openings of the screen and so become detached in this manner from the stalks, or in some cases the fingers directly detach them.

The short stalks or stems from which the hops are separated as just described, are carried along by the screen until they fall off it as it passes around one of the screen carrying drums.

Leaves also fall through the mesh with completely picked hops, and are subsequently separated in any suitable manner from these hops.

The arrangement just described has been found to be open to the objection that all the hops are not detached from the aforesaid short stalk or stem portions.

The object of the present invention is to obviate, or at least considerably minimise, the foregoing disadvantage.

According to the present invention, the screen is provided with projections designed to ensure that the greatest possible number of hops shall be detached from the aforesaid short stalk or stem portions.

According to one construction, the screen projections are in the form of loops, inclining in a direction longitudinally of the screen, said loops being arranged to be engaged by the fingers, which latter, or the projections, or both, are resiliently mounted, so that such engagement shall be a yielding one.

The outer ends of the loops may conveniently be V-shaped, as it is found that when they are this shape their outer ends or apex portions very effectively catch or engage the hops.

If desired the fingers may also be in the form of loops, which, if preferred, may also have V-shaped outer ends.

According to a construction in which the projections of the screen are in the form of loops, as previously described, the screen is constructed between a pair of endless chains, which constitute the lateral margins of the screen and which are carried around suitable sprocket wheels, which are suitably rotated to cause the required movement of the screen.

Extending between and carried by the chains, at equal distances therealong, are rigid rods of circular cross section arranged in spaced relationship.

Carried between the rods are wire elements each of which is formed from a substantially V-shaped wire body, the outer ends of the limbs of which are provided with parallel extensions, each of which extensions has its outer end bent into the form of a hook.

Each of the limbs at a point about two-thirds of its length, inward from the hook formed at its outer end, is coiled to form a helical spring in such a manner that both the springs so formed are coaxial and of an internal diameter greater than that of the aforesaid rods, so that in the assembly of the screen these spring portions are slipped around one rod, while the hooks are hooked around the next rod, in order that the V-shaped portions overhang the parallel limb portions and are outwardly inclined away from the surface of the screen, in a direction longitudinally of the latter.

From the foregoing it will be readily seen that, whereas a part of each of the members just described helps, with the rods, to which it is attached, to form the screen, the other part forms a forwardly and outwardly inclined projection resiliently connected, by the aforesaid springs, to the screen.

These projections assist in catching or engaging any unsuccessfully picked hops, so that these become detached, the said projections operating closely adjacent or actually in engagement with the fingers, between which latter and said projections the aforesaid relative movement takes place.

The members just described are so arranged that the projections of the series of members, the helical spring portions of which are carried upon one rod, are arranged in half-pitch staggered relationship with respect to the projections of the members similarly carried upon the succeeding rod, the rods being drilled and provided with split pins to prevent longitudinal movement therealong of the members.

Alternatively, instead of the arrangement being such that the loops of one row are staggered with respect to those of another row, it may be such that the loops of each row are arranged closely adjacent to each other.

In this manner the screen may be assembled so that there is no area thereof without an effective loop portion and/or the loops can be arranged to form, in effect, a diamond mesh screen.

Obviously, instead of the effective or outer ends of the loops being of single V-shape, they may be undulated or comprise a plurality of V-shaped portions.

Furthermore, in some cases, if desired, the portions of the wire elements extending between the rods may be bent downward to form loops into which will fall "twinned" hops, which, joined by a short stem, may straddle the wire and so travel with the screen, a rotating brush, drum of picking fingers, or other suitable picking means, being provided under the screen to remove these hops.

The invention will now be described, by way of example, with reference to the accompanying drawings, in which:

Fig. 4 is a plan view of one of the screen forming elements.

Fig. 5 is a side view of this element.

Referring to the accompanying drawings, the machine comprises a conveyor formed of two chains, both indicated by 1 and each carried upon sprocket wheels such as 2 and 3, the sprocket wheels 2 being carried upon a shaft 4, and the sprocket wheels 3 being carried upon a shaft 5.

Figure 2:
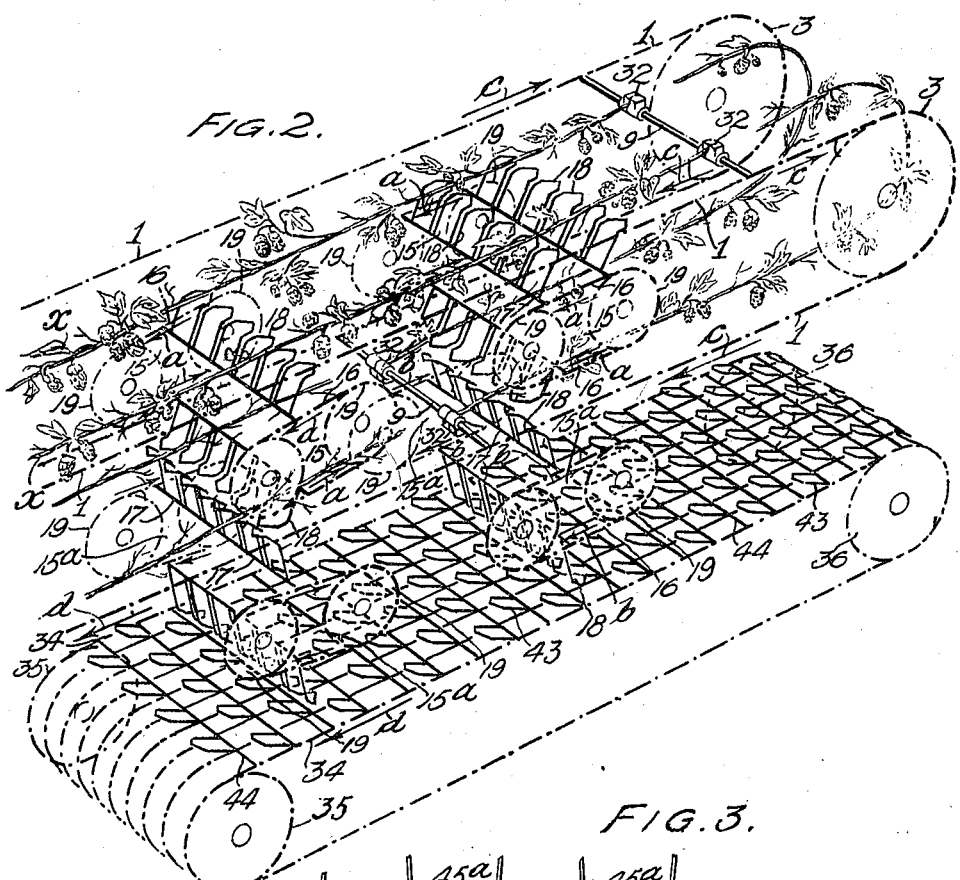
Fig. 2 is a diagrammatic perspective view of the machine, with a number of parts thereof omitted for the sake of clearness.

The shafts 4 and 5 are journaled respectively in pairs of bearings such as 6 and 7, mounted upon the main frame 8, and carried between the chains 1, at points arranged equidistantly throughout their length are rods 9 (see Fig. 2).

The sprocket wheels 2 are disposed at a level below that at which are disposed the sprocket wheels 3, and situated at locations intermediate of the sprocket wheels 2 and 3 are sprocket wheels 10 and 11 over which pass respectively the upper and lower runs of the chains 1, these sprockets being carried on shafts 10a and 11a, which are journaled in bearings such as 13, 14, mounted upon the aforesaid frame 8.

Sprockets 10 and 11 are located at such a level that the portions of the chains 1 extending between these sprockets and the sprockets 3 are horizontal, and the other portions of the chains incline upwardly in a forward direction from the sprockets 2 to the sprockets 10 and 11.

Disposed beneath the upper run of the horizontal portion of the conveyor is a plurality of units such as 15 each comprising a pair of parallel spaced apart chains 16, between which chains are carried bars 17 each carrying a series of looped wire picking fingers 18, as shown in Fig. 2, there being a considerable number of these bars, the majority of which have been omitted from Fig. 2 for the sake of clearness.

The looped wire picking fingers of one bar 17 are arranged in half-pitch staggered relationship with respect to those carried by the adjacent bars of the unit.

Each of the chains 16 is carried by a pair of sprocket wheels 19, carried upon shafts 20 journaled in the side plates 21 of the respective unit, the said units being in turn supported upon the frame 8.

The units 15 are driven from an electric motor 22 which drives, through reduction gearing, indicated generally by 23, a shaft 24 journaled in bearings 25 mounted upon the frame 8.

Mounted upon the shaft 24 are mitre wheels 26, which engage with and drive mitre wheels 27 mounted upon one of the shafts 20 of each of the units, the arrangement being such that the chains of these units are driven in the direction shown by arrows a in Fig. 2.

Disposed below the lower run of the horizontal portion of the conveyor is a plurality of units such as 15a the construction of which is exactly the same as that of the units 15, the units 15a, however, being arranged to run in the opposite direction to the units 15, as shown by the arrows b.

Each of the units 15a is driven through mitre wheels 26a, 27a, from a shaft 24a, this shaft being driven through a chain 28 and sprockets 29, 30, from the shaft 24.

The conveyor is driven, in the direction of the arrows c, through a shaft similar to the shaft 24, but disposed upon the opposite side of the machine, this shaft carrying a mitre wheel 31 which engages with and drives a similar mitre wheel (not shown) on the shaft 5.

It is to be noted that the picking fingers incline throughout their length rearwardly with respect to the direction in which they travel, their outer end portions being offset to be inclined at a greater angle than the inner or main body portions.

The operator stands at the end of the machine adjacent the sprockets 2, and attaches the butt ends of the bines x, by clips or clamps indicated diagrammatically, in Fig. 2, by 32 to the rods 9, by which rods the bines are then pulled over the units 15, by the picking fingers 18 of which some of the hops are removed, after which the said rods pull the bines round between the units 15 and 15a, under the combined action of which the remainder of the hops are removed.

Figure 1:
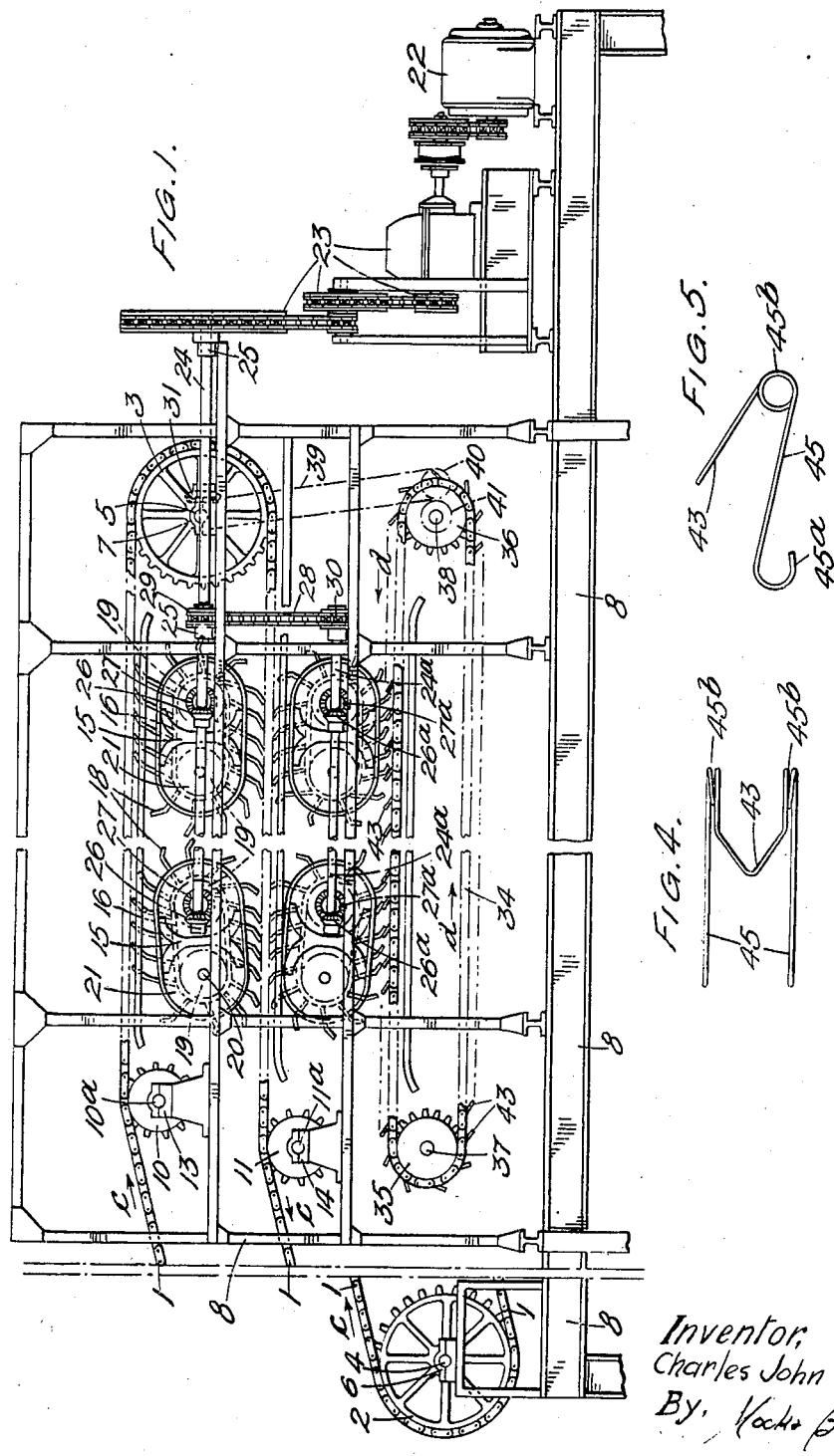
Fig. 1 is a side elevation of a hop picking machine embodying one form of the present invention.

The properly picked hops fall down through both runs of a wire mesh screen carried between a pair of spaced-apart parallel endless chains 34, each of which is carried by sprocket wheels 35, 36, the sprocket wheels 35, 35, being carried upon a shaft 37, and the sprocket wheels 36, 36, being carried upon a shaft 38, driven in the direction of the arrow d Fig. 1, from the shaft 5 through a chain 39, and sprocket wheels (not shown) together with gear wheels 40, 41.

Any hops, which, instead of being properly picked from the short stalks or stems by which they were originally attached to the bine, are still attached to these short stalks or stems, fall onto the screen.

These hop bearing stalks or stems, when falling onto the screen, as just described, are caught on resilient projections 43, with which the screen is provided, and are pulled along by these projections, under one of the units 15a, the downwardly projecting fingers 18 upon the underside of which are travelling in the same direction as, but at a greater speed than the projections 43, and thus, in addition to engaging the latter, as shown in Fig. 1, they slide therealong, and in so doing remove the hops from the said stalks or stems.

Carried at intervals of 5½ inches between the chains 34 are hollow bars 44 of circular cross-sectional outline.

In Figs. 4 and 5 is shown one of the elements of which the screen is built up, and in which it will be seen that each of these elements is formed from a substantially V-shaped wire body, the outer ends of the limbs of which are provided with extensions 45, each of which extensions is at its outer end bent into the form of a hook 45a.

Figure 3:
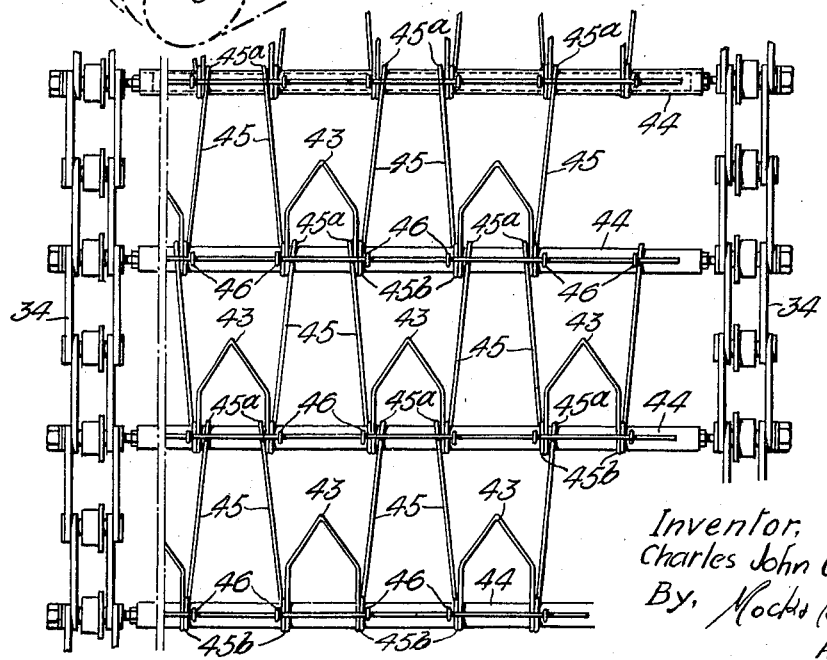
Fig. 3 is a plan, to a larger scale, of part of the screen.

Each of the extensions 45, at a point situated at about two thirds of its length, inward from the hook 45a is coiled to form a helical spring 45b, in such a manner that both these springs are coaxial and of an internal diameter greater than the external diameter of the bars 44, so that in the assembly of the screen these springs are slipped around one bar 44, while the hooks 45a are hooked around the next bar 44, as shown in Fig. 3.

As can be seen from Fig. 3, a series of the members just described is placed on each of the rods 44, and the upwardly inclined substantially V-shaped portions and the adjacent parts of the extensions 45 constitute the projections 43, which are rendered resilient by the springs 45b.

The members are so arranged that the projections 43 of one series, the helical springs 45b of which are carried upon one rod 44, are arranged in staggered relationship with respect to the projections 43 of the members similarly carried upon the succeeding rod 44.

The rods 44 are drilled and provided with split pins 46 to prevent longitudinal movement therealong of the members, and at the same time maintain the latter in their correct positions. Passed through the eyes of the split pins 46 of each rod 44 is a stiff wire 47, which serves solely to prevent the hooked ends 45a from slipping off the rods 44.

From the foregoing description it will be readily seen that the screen projections 43, cooperate with the fingers 18 to ensure that the greatest possible number of hops shall be detached from the aforesaid short stalks or stem portions which fall onto the screen, the hops so detached falling through both runs of the screen.

In some cases of course the picking fingers 18 happen to directly engage hops upon the screen, the stalks of which have been caught in one manner or another, and pull these hops from the stalks.

The screen has been found to operate efficiently when the average width of each mesh opening is approximately 2½ inches.

Although in the machine just described, the projections of the screen are arranged in staggered rows, this is not essential, as in many cases the projections of each row could be arranged closely adjacent each other instead of being spaced apart.

Furthermore, instead of the screen being always caused to travel in the same direction as the picking fingers co-operating therewith it could, in some cases, be caused to travel in the opposite direction, as it would then tend to return any semi-picked short stalk or stem portions back into the machine.

It will be readily seen that the rods 44 prevent the screen from sagging across its width and thereby render unnecessary the hereinbefore described end supporting drums, between which latter and the lower run of the screen, hops and stalks which have collected on said lower run in a tangled mass, have been carried, with the result that the screen has been either seriously strained or broken.

I claim:

1. In a hop picking machine of the kind described, a bine conveyor to which the bines are attached, picking fingers which operate upon the bines carried by said conveyor, a travelling screen, beneath said conveyor and said picking fingers, comprising a series of transverse members arranged at intervals throughout its length, a series of tines carried upon each of said transverse members and arranged to cooperate with said picking fingers to pick hops from stalks previously detached from the bines, and tail portions upon each of said series of tines extending between and connected to the transverse member carrying said series and one of said transverse members adjacent thereto to form with said transverse members openings to permit the passage of picked hops through said screen but to cause the latter to retain all stalks detached from the bine.

2. In a hop picking machine of the kind described, a bine conveyor to which the bines are attached, picking fingers which operate upon the bines carried by said conveyor, a traveling screen, beneath said conveyor and said picking fingers, comprising a pair of flexible members arranged in spaced parallel relationship, a series of rigid bars carried by and extending between said flexible members and arranged at intervals therealong, a series of tines carried upon each of said bars and arranged to cooperate with said picking fingers to pick hops from stalks previously detached from the bines, and tail portions upon each of said series of tines extending between and connected to the bar carrying said series of tines and the bar carrying the next series thereof, to form with said bars openings to permit the passage of picked hops through said screen but to cause the latter to retain all stalks previously detached from the bine.

3. In a hop picking machine of the kind described, a bine conveyor to which the bines are attached, picking fingers which operate upon the bines carried by said conveyor, a traveling screen, beneath said conveyor and said picking fingers, comprising a series of transverse members arranged at intervals throughout its length, a series of tines resiliently mounted upon each of said transverse members and arranged to cooperate with said picking fingers to pick hops from stalks previously detached from the bines, and tail portions upon each of said series of tines extending between and connected to the transverse member upon which said series of tines is mounted and one of said transverse members adjacent thereto to form with said transverse members openings to permit the passage of picked hops through said screen but to cause the latter to retain all stalks detached from the bine.

4. In a hop picking machine of the kind described, a bine conveyor to which the bines are attached, picking fingers which operate upon the bines carried by said conveyor, a travelling screen, beneath said conveyor and said picking fingers, comprising a pair of flexible members arranged in spaced parallel relationship, a series of rigid bars carried by and extending between said flexible members and arranged at intervals therealong, a series of tines resiliently mounted upon each of said bars and arranged to cooperate with said picking fingers to pick hops from stalks previously detached from the bines, and tail portions upon each of said series of tines, extending between and connected to the bar upon which is mounted said series of tines and the bar upon which is mounted the next series thereof, to form with said bars openings to permit the passage of picked hops through said screen but to cause the latter to retain all stalks previously detached from the bine.

5. In a hop picking machine of the kind described, a bine conveyor to which the bines are attached, picking fingers which operate upon the bines carried by said conveyor, a traveling screen, beneath said conveyor and said picking fingers, comprising a series of transverse members arranged at intervals throughout its length, a series of tines, in the form of loops, carried upon each of said transverse members and arranged to cooperate with said picking fingers to pick hops from stalks previously detached from the bines, and tail portions upon each of said series of tines extending between and connected to the transverse member carrying said series and one of said transverse members adjacent thereto to form with said transverse members openings to permit the passage of picked hops through said screen but to cause the latter to retain all stalks detached from the bine.

6. In a hop picking machine of the kind described, a bine conveyor to which the bines are attached, picking fingers which operate upon the bines carried by said conveyor, a travelling screen, beneath said conveyor and said picking fingers, comprising a pair of flexible members arranged in spaced parallel relationship, a series of rigid bars carried by and extending between said flexible members and arranged at intervals therealong, a series of tines, in the form of loops carried upon each of said bars and arranged to cooperate with said picking fingers to pick hops from stalks previously detached from the bines, and tail portions upon each of said series of tines extending between and connected to the bar carrying said series of tines and the bar carrying the next series thereof, to form with said bars openings to permit the passage of picked hops through said screen but to cause the latter to retain all stalks previously detached from the bine.

7. In a hop picking machine of the kind described, a bine conveyor to which the bines are attached, picking fingers which operate upon the bines carried by said conveyor, a travelling screen, beneath said conveyor and said picking fingers, comprising a series of transverse members arranged at intervals throughout its length, a series of tines, in the form of loops resiliently mounted upon each of said transverse members and arranged to cooperate with said picking fingers to pick hops from stalks previously detached from the bines, and tail portions upon each of said series of tines extending between and connected to the transverse member upon which said series of tines is mounted and one of said transverse members adjacent thereto to form with said transverse members openings to permit the passage of picked hops through said screen but to cause the latter to retain all stalks detached from the bine.

CHARLES JOHN GRAY.